United States Patent [19]

Soicke et al.

[11] Patent Number: 5,639,938
[45] Date of Patent: Jun. 17, 1997

[54] METHOD OF PREVENTING THE FORMATION OF $SO_3$-MISTS FROM OLEUM

[75] Inventors: Hartwig Soicke, Overath; Georg Mannebach, Huerth, both of Germany

[73] Assignee: Degussa Aktiengesellschaft, Frankfurt am Main, Germany

[21] Appl. No.: 421,156

[22] Filed: Apr. 10, 1995

[30] Foreign Application Priority Data

Apr. 13, 1994 [DE] Germany ............... 44 12 633.6

[51] Int. Cl.⁶ ............... A62D 3/00; C01B 17/69
[52] U.S. Cl. ............... 588/242; 423/271; 423/522; 252/192; 588/257
[58] Field of Search ............... 423/265, 270, 423/271, 522; 252/192; 502/409, 410, 411; 588/257, 242

[56] References Cited

U.S. PATENT DOCUMENTS

| | | | |
|---|---|---|---|
| 3,927,975 | 12/1975 | Sumner | 423/522 |
| 3,950,494 | 4/1976 | Guenthner | 423/270 |
| 3,993,443 | 11/1976 | Guenthner | 23/293 S |
| 3,994,821 | 11/1976 | Siedenberger | 252/192 |
| 4,174,292 | 11/1979 | Seidenberger et al. | 252/192 |
| 4,460,292 | 7/1984 | Durham et al. | 405/128 |
| 4,547,290 | 10/1985 | Pichat | 210/751 |
| 4,840,734 | 6/1989 | Johnson | 210/660 |
| 5,342,543 | 8/1994 | Morris | 252/190 |

FOREIGN PATENT DOCUMENTS

| | | |
|---|---|---|
| 0492146A1 | 11/1991 | European Pat. Off. . |
| 0506421A1 | 3/1992 | European Pat. Off. . |
| 94105016 | 6/1994 | European Pat. Off. . |
| 2452061B2 | 11/1974 | Germany . |
| 137 256 | 8/1979 | Germany . |
| 32 30 259 A1 | 2/1984 | Germany . |
| 4027332A1 | 8/1990 | Germany . |
| 4041828A1 | 12/1990 | Germany . |
| 2241499 | 2/1991 | United Kingdom . |
| WO87/06758 | 5/1987 | WIPO . |

Primary Examiner—Gary P. Straub
Attorney, Agent, or Firm—Beveridge, DeGrandi, Weilacher & Young, L.L.P.

[57] ABSTRACT

The formation of $SO_3$ mists is prevented by covering the oleum with a natural silicate excluding sand.

7 Claims, No Drawings

METHOD OF PREVENTING THE FORMATION OF SO₃-MISTS FROM OLEUM

INTRODUCTION AND BACKGROUND

The present invention relates to a method of preventing the formation of $SO_3$ mists from oleum (fuming sulfuric acid).

Sulfuric acid and oleum are clear, colorless liquids which are also slightly turbid and oily in industrial grades. Whereas sulfuric acid is odorless, oleum develops white mists in the air. The physical properties of the various concentrations of the liquids can differ considerably. The commercial concentrations (sulfuric acid 78%, 96%; oleum 20%, 27%, 65%) are the result from the solidification point curve of the $SO_3/H_2O$ system, which exhibits minima at each of these concentrations. The maxima correspond to defined compounds of $SO_3$ with $H_2O$ (e.g., $H_2SO_4 \cdot H_2O$, $H_2S_2O_7$).

Solutions of $SO_3$ in sulfuric acid—oleum or fuming sulfuric acid have a considerable $SO_3$ vapor pressure at normal temperatures already.

Sulfuric acid is a strong acid. Concentrated acid and especially oleum are oxidizing agents, especially at elevated temperatures. The acid is hygroscopic. Since a rather considerable amount of heat is released upon mixing with water (85.5 kj/mole $H_2SO_4$ upon mixing with water at 20° C.), the dilution reaction can be explosive. In addition, oleum forms dense mists with water. The water-removing action of oleum causes strong burn wounds on the skin of workers exposed to it and the skin heals poorly. In addition, wood and several organic substances are decomposed to carbon upon exposure to oleum.

Glass, enamel or ceramic materials (porcelain) are used to handle sulfuric acid or oleum of all concentrations, especially if contamination by foreign ions are to be avoided. When metals, plastics or rubber are used in the handling of these acids, precautions must be taken as to temperature and concentration of the acid. Lead protected by a layer of $PbSO_4$ can be used as material for handling dilute acids up to approximately 85%. Other metals, even iron and steels, are attacked by weak acids.

Suitable materials for handling concentrated acids are grey iron, cast Si, steel, if a limited loss of metal is accepted in the bargain, or special steels (e.g., tool steel No. 1.4541 or 1.4571). Grey iron can not be used for handling oleum since the material is heavily corroded due to the oxidation of the carbon.

Rubber coated apparatuses or lines can be used for carrying acids up to approximately 70% concentration. However, PVC, polypropylene or polyethylene, which can even be used for cold sulfuric acid, are generally used today in this area. The fluorinated plastics PTFE or FEP are suitable for handling all concentrations of acid, even oleum.

Sulfuric acid and oleum cause severe skin burns and destroy tissue. The eyes of workers are especially at risk. Vapors or mists containing sulfuric acid and/or oleum result in severe irritations of the eyes, skin, respiratory system and lungs.

When working with sulfuric acid and oleum, protective equipment consisting of an acid-proof work suit and protective goggles must be worn for protection of workers. For work in which a direct contact with sulfuric acid or oleum is possible, additional protective equipment is to be used, e.g. face shield, rubber gloves, full protection on a PVC basis, heavy-duty respiratory protection system. If vapors or mists containing sulfuric acid or oleum occur, respiratory protective devices with P2 protective particle filters must be used, e.g. a full protective mask with ABEK P2 filter of the Drager company.

The value of the maximum workplace concentration (MAK value) (1984) is:

Sulfuric acid 1 mg/m³≈0.245 ppm

Odor threshold:

Sulfuric acid 0.6 mg/m³.

A number of different countries have adopted strict regulations when dealing with hazardous materials. For example, when working with oleum in Germany the notices of the German employer's liability insurance association apply: M004 notice "Irritating Substances/Burning Substances" (11-83 issue); M051 notice "Dangerous Chemical Substances" (4-84 issue); T015 notice about the emptying of acids and lyes from railroad tank cars (issue 71).

The dilution of sulfuric acid with water can be carried out only in such a manner that the acid runs slowly into the water, never the inverse, and attention must be paid to the dilution heat created in the process.

The open, exposed handling of all oleum types or the contact of oleum with moist air results in the formation of fine sulfuric-acid or oleum mists which must be avoided under all circumstances. An effective separation of such mists can only be achieved with fiber filters. The venting of containers or tanks should be secured via a sulfuric-acid washer with fiber filter.

Leaking or spilled acid and oleum must be trapped to the extent possible. Covering them with absorbent material such as dry earth or sand is possible. Sulfuric acid can be neutralized with soda, lime or ash, but oleum reacts in an extremely exothermal manner with these substances, generating a high level of evaporation of $SO_3$. Only rather small amounts of acid can be washed away with water. Cloths, sawdust or other organic material can not be used to wipe up or absorb oleum or concentrated sulfuric acid.

On account of the strong tendency for the formation of mists due to the release of $SO_3$ vapors into the environment, there is the necessity of neutralizing leaked oleum as rapidly as possible and of using a means which prevents the spread of $SO_3$. It is known that leaked oleum can be covered with sand. However, sand has the disadvantage that it sinks immediately into the oleum, thus freeing the surface of the oleum for further evaporation. A further development of $SO_3$ mist is then possible again. A further disadvantage is the fact that the oleum is not neutralized.

It is also known that oleum can be covered with a white oil (e.g., Winog 70). However, this method has the disadvantage that a disposal of the contaminated product thereafter is possible only by suction. Furthermore, this method can only be used conditionally with 30 to 40% oleum because at higher concentrations of the oleum the decomposition of the organic component occurs so rapidly that a sufficient covering is not achieved.

For the above reasons there exists in the art the problem of finding a method which effectively prevents the formation of $SO_3$ mists and makes possible a problem-free disposal of the oleum.

SUMMARY OF THE INVENTION

One object of the present invention is to provide a method of preventing the formation of $SO_3$ mists from oleum which is characterized in that the oleum is covered with a finely divided natural silicate (with the exception of sand) such as talcum or mica. The silicate can contain, for example, a synthetic silica in an amount of 1 to 20% by weight.

DETAILED DESCRIPTION OF THE INVENTION

According to a more detailed aspect of the invention, the amount of synthetic silica, which can be rendered hydrophobic, if desired, can be 3 to 10% by weight.

A pyrogenically produced or a precipitated silica can be used as the synthetic silica according to the invention.

Silicates with a layer, flake and/or platelet structure such as e.g. talcum can be used as the natural silicate. In particular, talcum or mica, preferably talcum, can be used. In an advantageous manner, when talcum was used, not only was the surface of the oleum covered but the acidic property of the oleum can also be neutralized. Talcum has the advantage that it exhibits an alkaline pH of approximately 9.3. Due to its fine, powdery structure it sinks only very slowly into the oleum. Accordingly, there is sufficient time for a reaction of the oleum with the OH groups of the talcum.

The addition of synthetic silica to the silicate used in the treatment improves the flowability of the talcum. The amount of silicate in proportion to the oleum can be 1:1 to 3:1 by weight. A larger amount of silicate is not disadvantageous. However, the minimum amount of silicate should be sufficient to completely cover the spilled oleum.

After covering the spilled oleum with the silicate the mixture can be allowed to rest and slowly react further for about 1 to 2 days. The residual acid can subsequently be neutralized in a relatively safe fashion by adding milk of lime, $Na_2CO_3$ or dilute sodium hydroxide solution.

The application of the silicate in accordance with the invention to spilled oleum can be carried out with known devices and equipment for combatting metal fires and for handling hazardous waste.

EXAMPLES

The following tests were carried out with 2 types of powder extinguishers:

1. ABC extinguisher filled with 6 kg talcum
2. Metal-fire extinguisher with applicator filled with 6 kg talcum with an addition of 5% Sipernat 22 (produced by Degussa AG).

Three tests were carried out with different amounts of oleum. The tests showed that the ABC extinguisher filled with talcum alone is not suitable. The talcum exits under too high a pressure. This results in a strong development of dust. Because of the high pressure, the talcum can not be brought in a purposeful manner onto the oleum. In contrast thereto, the tests with the metal-fire extinguisher are satisfactory. As a result of the low pressure in the extinguisher the oleum can be well-covered in a short time (about 1 to 2 minutes).

Test 1: 500 g oleum are poured into a pan (dimension 30×40 cm). The covering of the oleum is carried out with an ABC extinguisher. The covering is unsatisfactory because the talcum is distributed with too high a pressure. The high pressure results in a strong development of dust.

Test 2: 100 g oleum are poured into a pan (dimension 30×40 cm). The covering of the oleum with the silica is carried out with a metal-fire extinguisher with applicator. After about 3 minutes only sporadic $SO_3$ mists can be perceived on the surface of the oleum. These spots are covered in a purposeful manner with talcum. The metal-fire extinguisher is filled with talcum with 5% Sipernat 22 as an additive.

Test 3: 1000 g oleum are poured into a pan (dimension 30×40 cm). The covering of the oleum with the silica is subsequently carried out with a metal-fire extinguisher with applicator. After about 1 to 2 minutes only sporadic $SO_3$ mists can be perceived on the surface of the oleum. These spots are covered in a purposeful manner with talcum. The content of the metal-fire extinguisher is the same as in test 2.

Test 4: 100 g oleum were covered with 125 g talcum with the addition of 5% Sipernat D 17 (a silica produced by Degussa AG). After about 10 seconds no $SO_3$ mists could be perceived. After 10 minutes a thorough oleum-talcum mixing was observed. No $SO_3$ mists were observed. The oleum was distributed over a surface of approximately 80 $cm^2$.

Test 5: 100 g oleum were covered with 150 g talcum with the addition of 5% Sipernat 22 S. After about 10 seconds no $SO_3$ mists could be perceived. After 10 minutes the oleum was distributed over a surface of approximately 80 $cm^2$.

Test 6: 200 g oleum were covered with 280 g talcum with the addition of 5% Sipernat 22 S. After about 10 seconds no $SO_3$ mists could be perceived. The oleum was distributed over a surface of approximately 1200 $cm^2$.

Test 7: 200 g oleum were covered with 370 g talcum addition of 5% Sipernat D 17. After about 10 seconds no $SO_3$ mists could be perceived. The oleum was distributed over a surface of approximately 1200 $cm^2$.

The silicas Sipernat D 17, 22 S and 22 used are finely divided precipitated silicas produced by Degussa AG.

As can be seen from the above, the amounts of silicate used for the oleum can vary widely with good results. The above examples show the range of approximately 1 part oleum to 1 to 2 parts of silicate.

Further variations and modifications of the foregoing will be apparent to those skilled in the art and such variations and modifications are attended to be encompassed by the claims that are appended hereto.

German Priority Application P 44 12 633.6, filed on Apr. 13, 1994, is relied on and incorporated by reference.

What is claimed:

1. A method for the adsorption of $SO_3$ mist from spilled or leaked oleum and the prevention of the spread thereof comprising covering the spilled or leaked oleum with a finely divided natural silicate which is a member selected from the group consisting of talcum and mica in a sufficient amount to adsorb and react with the oleum to prevent the formation of $SO_3$ mist.

2. The method according to claim 1, wherein said the weight ratio of said silicate to said oleum is 1:1 to 3:1.

3. A process according to claim 1, wherein a pyrogenic silica is added to the natural silicate.

4. a process according to claim 3, wherein the pyrogenic silica is added to the natural silicate in the amount of 1 to 20% by weight.

5. A process according to claim 3, wherein the pyrogenic silica is added to the natural silicate in the amount of 3 to 10% by weight.

6. The method according to claim 3, wherein said pyrogenic silica is hydrophobic.

7. The method according to claim 3 wherein said silicate and pyrogenic silica are applied together to the oleum with a fire extinguisher with applicator.

* * * * *